United States Patent

[11] 3,610,698

| [72] | Inventors | Jean Gachot<br>179 Avenue de la Division Leclerc, Enghien;<br>Fernand Perales, 87, Rue A. G. Belin, Argenteuil, both of France |
|---|---|---|
| [21] | Appl. No. | 823,296 |
| [22] | Filed | May 9, 1969 |
| [45] | Patented | Oct. 5, 1971 |
| [32] | Priority | May 15, 1968, Dec. 19, 1968 |
| [33] | | France |
| [31] | | 151,804 and 179,151 |

[54] COMPRESSED AIR BRAKE SYSTEMS FOR VEHICLES
5 Claims, 10 Drawing Figs.

[52] U.S. Cl. .................................................. 303/2,
137/112, 137/113, 137/525.3, 303/84 A
[51] Int. Cl. ........................................................ B60t 15/00,
B60t 11/32, B60t 13/42
[50] Field of Search .......................................... 303/84, 84
A, 2, 7; 137/112, 113, 525.3, 63

[56] References Cited
UNITED STATES PATENTS

| 2,906,281 | 9/1959 | Pillote | 137/525.3 |
| 791,666 | 6/1905 | Wishart | 137/112 UX |
| 2,044,921 | 6/1936 | Swanland | 137/112 |
| 2,354,791 | 8/1944 | Boldt | 137/112 |
| 3,260,274 | 7/1966 | Morgan | 137/113 |
| 3,369,496 | 2/1968 | Bushmeyer | 137/112 X |

FOREIGN PATENTS

| 1,327,644 | 4/1963 | France | 137/61 |

Primary Examiner—Milton Buchler
Assistant Examiner—John J. McLaughlin
Attorney—Young & Thompson ABSTRACT: A compressed-air brake system for vehicles and especially road vehicles comprising two air circuits terminating in two of the ports of a double check valve whilst the third port serves to supply a common terminal pipe which extends to a receiving unit. The system is characterized in that the double check valve comprises a flap pivotally mounted between the two first ports aforesaid and capable of selectively obturating one of said ports under the action of compressed-air supplied through the other port.

Preferably the flap comprises a small flexible plate having one extremity which is inserted in the valve body.

PATENTED OCT 5 1971 3,610,698

INVENTORS
JEAN GACHOT
FERNAND PERALES
By Young & Thompson
ATTYS.

PATENTED OCT 5 1971 3,610,698

INVENTORS
JEAN GACHOT
FERNAND PERALES
By Young + Thompson
ATTYS.

COMPRESSED AIR BRAKE SYSTEMS FOR VEHICLES

The present invention relates to an improved compressed-air brake system for vehicles in which the brakes are intended to be supplied with compressed air through a number of independent circulation systems or circuits.

It is known that, in compressed-air brake systems which are installed on road vehicles such as heavy trucks or lorries, the brake cylinders are supplied with compressed air in many cases through two different circuits which are not in principle employed at the same time. These two circuits usually meet at a given point, beyond which they have a common portion. There is therefore placed at the point considered a first admission pipe, a second admission pipe and a discharge pipe which delivers to the receiving unit.

When the brake is actuated by means of the first circuit, all communication must be cut off between the second admission pipe and the discharge pipe. As soon as the brakes are released, the receiving unit begins to empty and the compressed air contained therein must be discharged in the opposite direction through the same circuit. The operations take place in a similar manner if the second air circuit is employed.

In order to obtain this result, the three pipes mentioned above are connected in known manner to a junction unit which has three passageways or ports and performs the function of a valve. Said junction unit or so-called double check valve can be constructed in known manner, for example by means of a piston or a slide valve which is designed to slide within its chamber under the pressure of compressed air and which puts the discharge port into communication either with one intake port or with the other; a seal is necessary in that case for the purpose of ensuring leak-tightness between the moving member (piston or slide valve) and the valve body.

However, a system of this type does not have sufficient sensitivity by reason of the friction developed at the level of the seal. Such friction can even cause jamming of the moving member as a result of admission of dust particles in the compressed air circuit. Jamming may also occur during cold weather as a result of condensation of water within the valve followed by ice formation. Finally, the system calls for appreciable maintenance since the moving member is subject to wear and the seal has to be replaced at fairly frequent intervals.

The present invention is concerned with the utilization of a double check valve as applied to a brake circuit of the above-mentioned type for the purpose of overcoming the different disadvantages referred to in the foregoing.

In accordance with the invention, the compressed-air brake system for vehicles and especially road vehicles comprises two air circuits terminating in two of the ports of a double check valve whilst the third port serves to supply a common terminal pipe which extends to a receiving unit. The system is characterized in that the double check valve comprises a flap pivotally mounted between the two first ports aforesaid and capable of selectively obturating one of said ports under the action of compressed air which is supplied through the other port.

Under these conditions, the pivotal flap remains in the mean or central position as long as the brake system is not in service. When the compressed air is directed into one of the two admission circuits, the air forces back the flap which is hermetically applied against the port of the other circuit, with the result that the air is conveyed toward the third port.

The operation of the double valve is thus both simple and reliable.

In a preferred embodiment of the invention, the flap consists of a small flexible plate, one end of which is inserted in the double check valve and the other end of which is directed in the axis of the compressed-air discharge port which is connected to the common terminal pipe, the two admission ports being symmetrical with respect to the central position of the flap.

In some applications, it may be an advantage to employ flaps formed of a material which is resilient but not pliable and it is also an advantage to prevent the flap from being subjected to deformations having a point of inflection. One of the means contemplated by the invention for the achievement of this purpose consists of a flap formed by a small rigid plate pivotally mounted on its support, the ports of the valve body being accordingly provided in this case with slightly oblique seatings.

In a preferred embodiment which makes it possible both to prevent bending of the flap resulting in a point of inflection and to dispense with the need of an articulation, the flap has two faces disposed in the form of a wedge, the vertex of the acute angle thus made by the two faces being located on the side remote from the fixed portion of the flap.

The angle made by the wedge is determined as a function of the intended angle of inclination of the flap in the position of closure so as to permit of uniform contact over the port seating when the flap is deflected.

Preferably the flap is made up of a flexible core having a covering of elastic material on at least one face.

In accordance with a further improvement, provision is made for the use of a wedge-shaped flap combined with the oblique port seatings.

A number of other properties of the invention will further become apparent from the description which now follows below.

A number of embodiments of the invention are shown in the accompanying drawings which are given by way of example without limitation, and in which.

Figure 1:
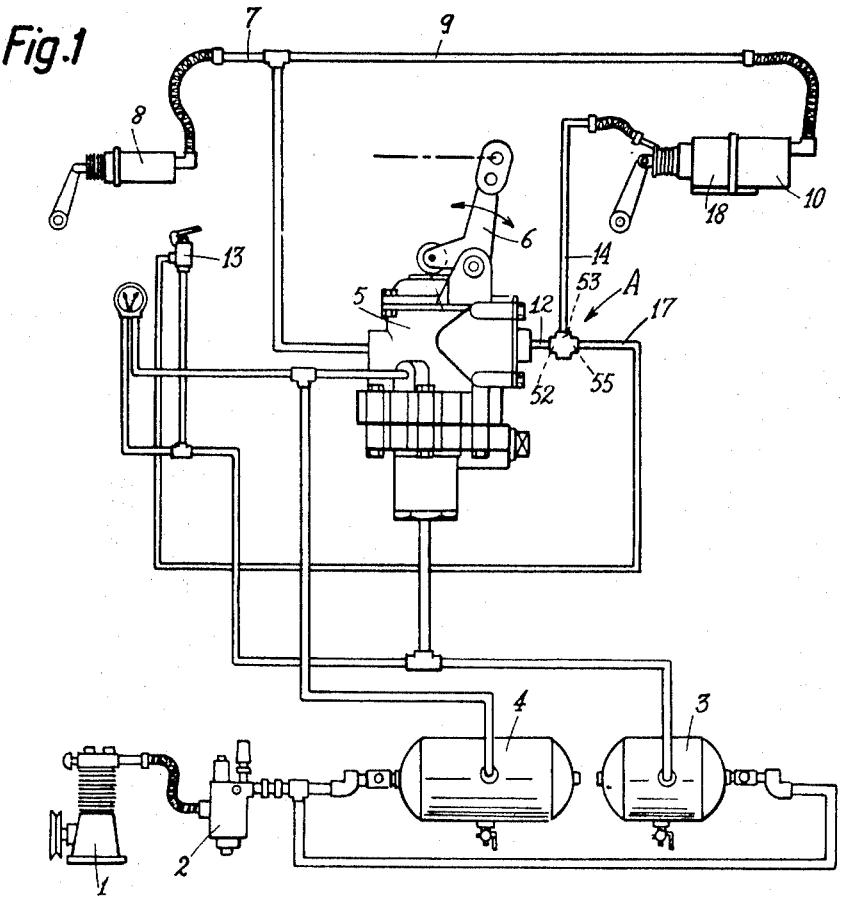
FIG. 1 is a diagrammatic presentation of a brake system which is adapted to the brake circuits of a truck or lorry.

Referring to FIG. 1, there is shown a brake system of a type known per se and designed, for example, for a truck having a rated weight of at least 16 tons. Said system comprises an air compressor 1 which delivers compressed air through a regulator 2 into two reservoirs 3 and 4. The reservoir 4 supplies compressed air through a brake-actuating unit 5 to the line 7 which terminates in the front brake cylinder 8 and the line 9 which terminates in the rear brake cylinder 10 of the vehicle. The brake-actuating unit 5 is fitted with a lever 6 which is controlled by the brake pedal (not shown) provided for the driver of the vehicle.

In the event of failure of this supply system, the compressed air of the reservoir 3 can be delivered into the emergency cylinder 18 of the rear brake through two circuits: the first circuit passes through the brake-actuating unit 5 and the pipe 12 which terminates in one of the ports of the double check valve A. The second circuit passes through the manual control valve 13, the pipe 17 and terminates in the other port of the double check valve A. Said double valve has a third port and a terminal pipe 14 extends from said port to the emergency cylinder 18.

A brake system of this type is described in greater detail in the French patent entitled "Compressed air brake system for motor vehcles" as filed by the present applicants on Nov. 8th, 1967.

Figure 4:
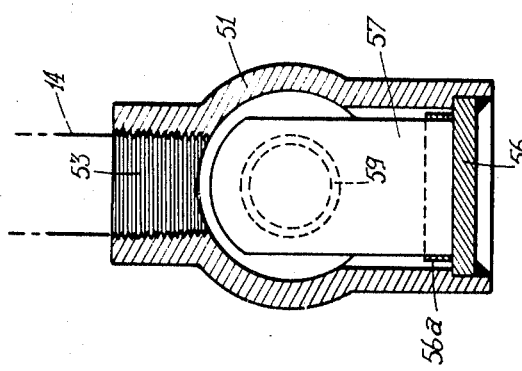
FIG. 4 is a sectional view along line IV–IV of FIG. 3.
Figure 2:
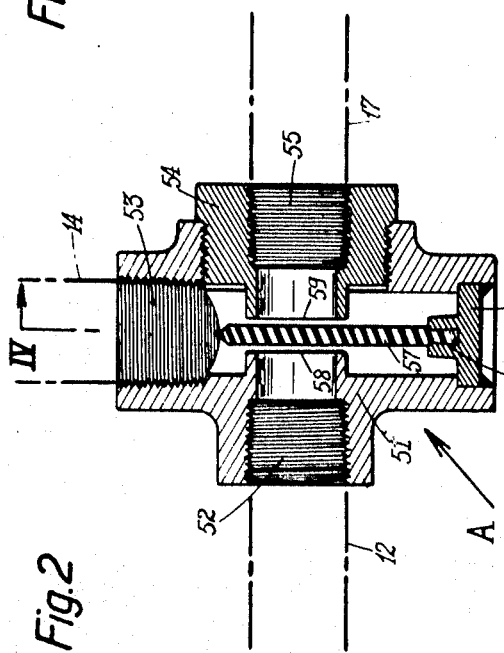
FIG. 2 is an elevational view of one form of construction of the three-way double check valve, this view being taken in cross section along line II—II of FIG. 3.
Figure 3:
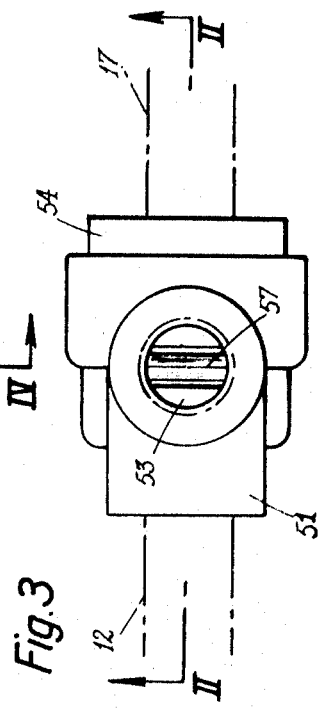
FIG. 3 is a corresponding plan view.

In accordance with the present invention, the double check valve A comprises (as shown in FIGS. 2, 3 and 4) a valve body 51 provided with two internally threaded ports. One port 52 is intended the port admit compressed air derived from the supply line 12 and terminates in a machined valve-seat 58 and the other port 53 is intended to deliver compressed air to the line 14. The valve body 51 is additionally provided on the side opposite to the port 53 with a recess in which is fixed the member 56 for supporting the flap 57 and, on the side opposite to the port 52, with another internally threaded recess in which is screwed an endpiece 54. Said endpiece is in turn traversed by an internally threaded passageway or port 55 which is coaxial with the port 52 and serves to admit compressed air derived from the supply line 17. Said port 55 terminates in a machined seating 59 in the same manner as the port 52. The flap 57 consists of a small flexible plate, one extremity of which is thinned so as to permit of its insertion in a groove 56a of the support member 56 and the other extremity of which is directed along the axis of the port 53 in the rest position. The central portion of the flap 57 is located in the rest position at an equal distance from the machined seatings 58 and 59 and the width of said central portion is greater than the external diameter of said seatings.

The flap 57 is preferably formed of either natural or synthetic rubber with a fabric core; the Shore hardness number of the tongue is preferably comprised between 50 and 55; in the rest position, the distance between each lateral face of the flap and the machined valve seats 58 and 59 is preferably comprised between 1 mm. and 1.5 mm.

The operation of this brake system is as follows:

When the system is not in service, the brake lines 7, 9, 12, 14 and 17 are at atmospheric pressure. The flap 57 of the double check valve A is in the mean or central position thereof and the line 14 communicates both with the lines 12 and 17.

When the driver of the vehicle depresses the brake pedal, the compressed air of the reservoir 4 is delivered into the brake cylinders 8 and 10. If the pressure within the reservoir 4 is insufficient and the driver continues to depress the pedal, the compressed air of the reservoir 3 is conveyed through the pipe 12 towards the double check valve A and, as the air arrives through the port 52, the flap 57 is accordingly thrust back against the seating 59 and cuts off any further communication between the line 17 and the line 14. The air flows out of the double check valve A through the port 53 and passes through the pipe 14 to the emergency cylinder 18 which actuates the rear brake.

In the event of jamming of the brake pedal or failure of the link-rod system which connects said pedal to the brake-actuating unit 5, the driver makes use of the manual control valve 13 which conveys the compressed air from the reservoir 3 through the pipe 17 to the double check valve A; as it arrives through the port 55, the compressed air applies the flap 57 against the valve seat 58 and prevents further communication between the line 12 and the line 14. The air is discharged from the double check valve A through the port 53 and passes as in the previous case through the pipe 14 before finally reaching the cylinder 18.

The flap 57 remains applied against the seating 58 or 59 as the case may be as long as there remains any compressed air within the cylinder 18 and the pipe 14, then returns to its central position.

It is thus apparent that the rear emergency brake 18 is supplied with compressed air either through the brake-actuating unit 5 or through the manual control valve 13 without any danger of interference with the changeover from one mode of supply to the other as a result of either dust or moisture. Furthermore, it is not possible to establish any untimely communication between the two supply lines 12 and 17 which would cause loss of compressed air and a pressure drop within the circuit which is in service at the moment considered.

Since the displacements of the pivotal flap 57 about the central position thereof are of very small amplitude and do not cause any friction, said flap is practically not subject to any wear and the check valve A calls for only minimum maintenance.

Figure 6:
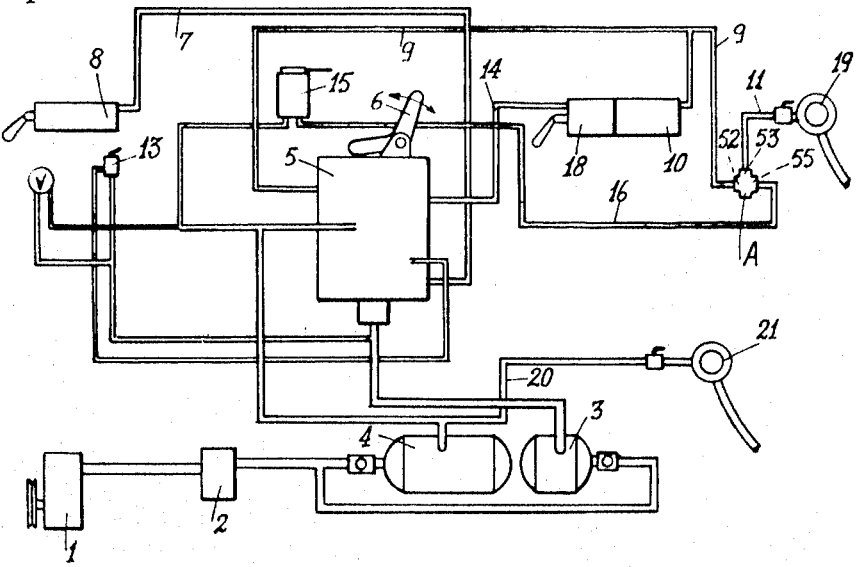
FIG. 6 is a diagrammatic view which is similar to FIG. 1 and shows the application of the invention to the brake circuits of a tractor vehicle and of a trailer or semitrailer.
Figure 5:
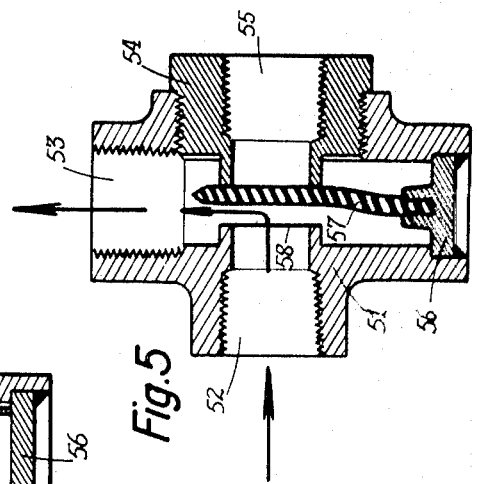
FIG. 5 is a view which is similar to FIG. 2 showing the double check valve during operation.

The embodiment shown in FIG. 6 is concerned with the application of the invention to the brake system of a tractor vehicle and trailer (or semitrailer). The compressed air derived from the reservoir 4 can be supplied to the double check valve A through two different circuits, namely through the brake-actuating unit 5 and the pipe 9 which is connected to the port 52 or through the manual-control valve 15 and the pipe 16 which is connected to the port 55. In both cases, the compressed air which is discharged from the double check valve A through the port 53 is delivered through the pipe 11 and the coupling head 19 into the brake cylinders of the trailer (not shown in the figure). This brake system is completed by a system for automatic braking of the trailer which operates in the event of failure of the hitch system. This system is represented in FIG. 6 by the pipe 20 which connects the compressed-air reservoir 4 to a second coupling head 21.

The mode of operation of the double check valve A, depending on whether said valve receives compressed air from the pipe 9 or from the pipe 16, is the same as in the embodiment first described; it is nevertheless worthy of note that the function of said valve is slightly different since it serves as a component of the service brake system of the trailer and no longer as a component of an emergency brake system.

It is apparent that the invention is not limited to the embodiment hereinabove described and that alternative forms of constructions can be contemplated. It accordingly follows that alternative forms of construction are possible in the case of the double check valve A: in particular, the flap could consist of a rigid plate which is pivotally mounted on its support. In this case, the seatings would be set at a small oblique angle.

Figure 7:
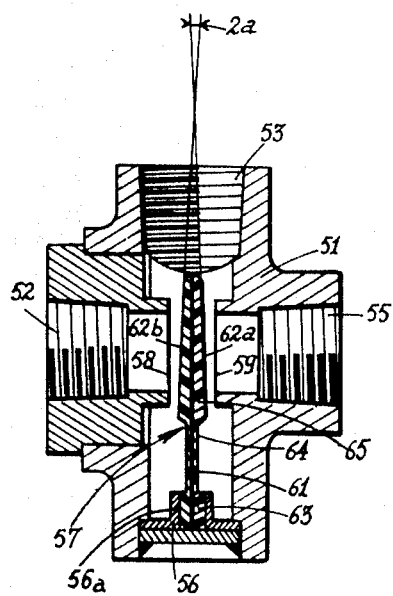
FIG. 7 is a sectional view taken along line VII—VII of FIG. 8 and illustrating one form of construction of the three-way double check valve.
Figure 9:
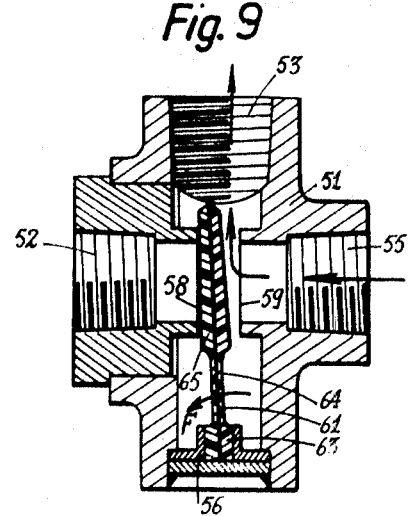
FIG. 9 is a view which is similar to FIG. 7 and shows the double check valve during operation.
Figure 8:
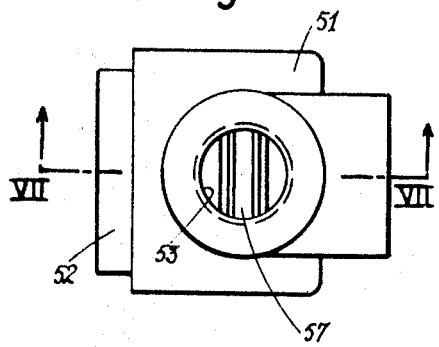
FIG. 8 is a plan view of the valve.

In the embodiment of FIGS. 7 to 9, the improved flap 57 comprises a thin and flexible core 61 made up, for example, of a fine mesh fabric of plastic material such as a polyamide resin. The faces of the core 61 are provided with two symmetrical covering elements 62a, 62b, formed of a material such as synthetic rubber and having a Shore hardness number of 80, for example. Each covering element 62a, 62b is preferably formed by molding and a foot 63 of said element is inserted in an added support 56 which is similar to the support considered earlier in the description. The foot 63 is followed by a thin portion 64, then by a wedge-shaped enlarged portion 65 which is so arranged that the thinnest portion of the wedge 65 is remote from the foot 63. A relatively small angle 2a is thus made by the two faces of the enlarged portion of the flap 57 and does not exceed 10°, for example.

The angle 2a is preferably determined so that, if the flap 57 bends about the feet 63, the enlarged portion 65 of one of the covering elements 62a, 62b is uniformly applied against one of the seats 58, 59 of the valve body 51.

If the valve seats 58, 59 are straight as in the case of the embodiment under consideration, this condition is satisfied if the angle at which the flap 57 can be inclined as a result of pseudorotation about the feet 63 is exactly equal to a.

It can thus be understood that, in the case of flow of air through the port 55 (as shown in FIG. 9), the flap 57 is deflected in the direction of the arrow F as a result of elastic deformation of the thin portions 64. Taking into account the value adopted for the angle 2a, the face 62b is accordingly applied against the valve seat 58, thus ensuring hermetic closure of the port 52. Furthermore, since there is only limited bending of the base of the flap, the service life of the flap is increased to an appreciable extent.

Figure 10:
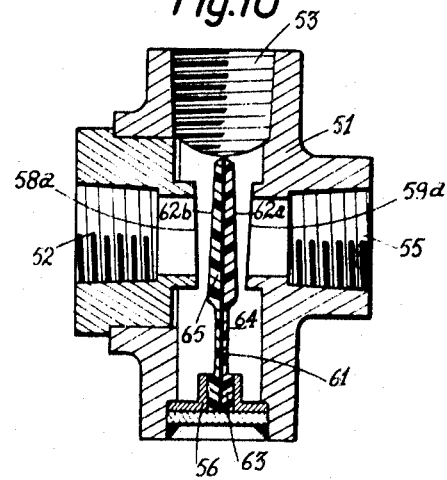
FIG. 10 is a view which is similar to FIG. 7 and shows an alternative form of construction.

In the embodiment of FIG. 10, these two valve seats 58a, 59a are cut obliquely. This arrangement combined with the wedge-shaped profile of the flap makes it possible to increase the cross-sectional area for flow between one of the valve seats considered and the flap without thereby increasing the distance between the seats.

It is apparent that further alternative designs of the flap can be contemplated. Thus, the flap can be formed with faces which are dissymmetrical with respect to the rigid central blade if the construction of the valve warrants this arrangement.

What we claim is:

1. A compressed air brake system for vehicles, comprising brake circuits and brake-actuating means for supplying compressed air to the brake circuits, a double check valve comprising a valve body, a chamber formed in said valve body, two inlet ports each connecting said chamber to one of said brake circuits, said inlet ports being substantially axially aligned, an outlet port connecting said chamber to a utilization circuit, flat valve seats defined within said chamber and entirely encompassing each of said inlet ports, and a flexible flap pivotally mounted within said chamber between said valve seats and having flat opposite faces each of which can contact a said flat valve seat entirely about a said inlet port thereby selectively to obturate one of said inlet ports under the action of compressed air supplied through the other inlet port, said flap extending in a direction substantially perpendicular to the axis of said inlet ports and having one end inserted in said valve body, said opposite faces of said flap being disposed at an acute angle to each other whose apex is remote from said inserted end of said flap, said flap tapering in thickness over all the portion of the flap that contacts said valve seats.

2. A brake system in accordance with claim 1, wherein at least one of said valve seats is obliquely disposed relative to the axis of the corresponding inlet port.

3. A brake system as claimed in claim 1, said portion of the flap that contacts said valve seats being separated from said inserted end by an intermediate part of reduced thickness.

4. A brake system as claimed in claim 1, said inserted end of said flap being fixed within a support that is fixed within an opening in the valve body.

5. A brake system in accordance with claim 1, characterized in that the flap consists of a flexible core having a covering of elastic material on at least one face.